US008590299B2

(12) United States Patent
   Padula

(10) Patent No.: US 8,590,299 B2
(45) Date of Patent: Nov. 26, 2013

(54) DEVICE TO CAPTURE WAVE ENERGY

(76) Inventor: Philip Padula, Farmington Hills, MI (US)

( * ) Notice: Subject to any disclaimer, the term of this patent is extended or adjusted under 35 U.S.C. 154(b) by 393 days.

(21) Appl. No.: 13/069,685

(22) Filed: Mar. 23, 2011

(65) Prior Publication Data
   US 2012/0240569 A1    Sep. 27, 2012

(51) Int. Cl.
   *F03B 13/18*    (2006.01)
   *F03B 13/10*    (2006.01)
   *F03B 13/12*    (2006.01)
   *H02P 9/04*    (2006.01)
   *F04B 17/00*    (2006.01)
   *F16H 27/02*    (2006.01)

(52) U.S. Cl.
   USPC ................ 60/507; 60/497; 290/42; 290/53; 417/331; 74/126

(58) Field of Classification Search
   USPC ......... 60/495–507; 290/42, 53; 417/330–331; 74/126–143; 192/48.92
   See application file for complete search history.

(56) References Cited

U.S. PATENT DOCUMENTS

| 3,964,264 | A | * | 6/1976 | Tornabene | 405/76 |
| 4,184,336 | A | * | 1/1980 | Lamberti | 60/507 |
| 4,438,343 | A | * | 3/1984 | Marken | 290/53 |
| 4,594,547 | A | * | 6/1986 | Halder | 324/141 |
| 4,598,547 | A | * | 7/1986 | Danihel | 60/507 |
| 5,662,009 | A | * | 9/1997 | Palmer | 74/810.1 |
| 6,009,707 | A | * | 1/2000 | Alkhamis | 60/398 |

* cited by examiner

*Primary Examiner* — Kenneth Bomberg
*Assistant Examiner* — Christopher Jetton
(74) *Attorney, Agent, or Firm* — Gifford, Krass, Sprinkle, Anderson & Citkowski, P.C.

(57) ABSTRACT

A device to capture and store or generate energy from variations in water level of a water body has a housing and an input shaft rotatably mounted to the housing. A drive belt is rotatably connected to the input shaft and a float is attached to that drive belt so that the float reciprocally drives the input shaft as the water levels increase and decrease. An output shaft is also rotatably mounted to the housing while a first one-way clutch is operatively disposed between the input shaft and the output shaft so that the input shaft rotatably drives the output shaft through the clutch in one rotational direction. A reversing gear is rotatably mounted to the housing and rotatably drives a second one-way clutch also operatively coupled to the second shaft to drive the second shaft in the same rotational direction as the first clutch, but during the opposite rotation of the input shaft.

10 Claims, 4 Drawing Sheets

DEVICE TO CAPTURE WAVE ENERGY

BACKGROUND OF THE INVENTION

I. Field of the Invention

The present invention relates to a device for capturing wave and/or tidal energy.

II. Description of Related Art

In view of the increasing cost of organic fuels, such as coal and oil, there has been a recent trend to harness energy for the generation of power from previously unharnessed or only marginally harnessed power sources. For example, wind turbines for generating electrical power from wind currents have enjoyed increased popularity.

A still further source of previously unharnessed energy is the energy generated and consumed from the movement of water levels in water bodies. For example, there are previously known devices for harnessing the energy occurring through the movement of ocean tides.

While the energy stored in the movement of water due to tidal variations is indeed large, the equipment necessary to harness that energy for the production of electrical power has proven to be costly not only to construct but also to maintain. Furthermore, the movement of the water between high tide and low tide occurs only once per day on the average so that the energy in tidal water can only be harvested once per day, i.e. when the tide moves from high tide to low tide. Because of these limitations, devices to harness energy from tidal movement of the oceans have not proven cost effective.

A still further type of natural energy that has been previously unharnessed, or only minimally so, is the energy in the changing water levels in a water body due to waves in the water body. Such waves are typically caused by wind and vary in both magnitude and frequency as a function of the available wind power. However, when waves are present, the waves rise and fall much more rapidly than the movement of water level due to tidal effects.

Previously, there have been no machines or devices which have effectively harnessed the energy from waves in a water body.

SUMMARY OF THE PRESENT INVENTION

The present invention provides a device which harnesses energy from waves or other changing water levels in the water body and either stores that energy in another structure, or generates electricity directly from that energy.

In brief, the device of the present invention comprises a housing having an input shaft rotatably mounted to the housing. A drive band, preferably an endless loop, is drivingly connected to the input shaft. A float is attached to the drive band and the float is disposed in the water body. Thus, as the water level changes in the water body due to waves, the float reciprocally drives the input shaft in response to the waves.

An output shaft is also rotatably mounted to the housing and is drivingly connected to an energy storage device or an electrical generator. Any conventional mechanism may be utilized to store the energy from rotation of the output shaft in a predetermined rotational direction.

A first one-way clutch is operatively disposed between the input shaft and the output shaft. This one-way clutch drivingly connects the input shaft to the output shaft upon rotation of the input shaft in a first rotational direction. A reversing gear is also rotatably mounted to the housing. This reversing gear is drivingly connected to the input shaft so that the reversing gear and input shaft rotate in unison with each other and in both rotational directions.

A second one-way clutch is operatively disposed between the reversing gear and the output shaft. The second one-way clutch drivingly connects the reversing gear to the output shaft upon rotation of the input shaft in a second rotational direction opposite from the first rotational direction. However, in view of the reversing gear, the rotation of the output shaft remains in the same rotational direction regardless of whether the first or second clutch is engaged.

BRIEF DESCRIPTION OF THE DRAWING

A better understanding of the present invention will be had upon reference to the following detailed description when read in conjunction with the accompanying drawing, wherein like reference characters refer to like parts throughout the several views, and in which.

DETAILED DESCRIPTION OF PREFERRED EMBODIMENTS OF THE PRESENT INVENTION

Figure 1:
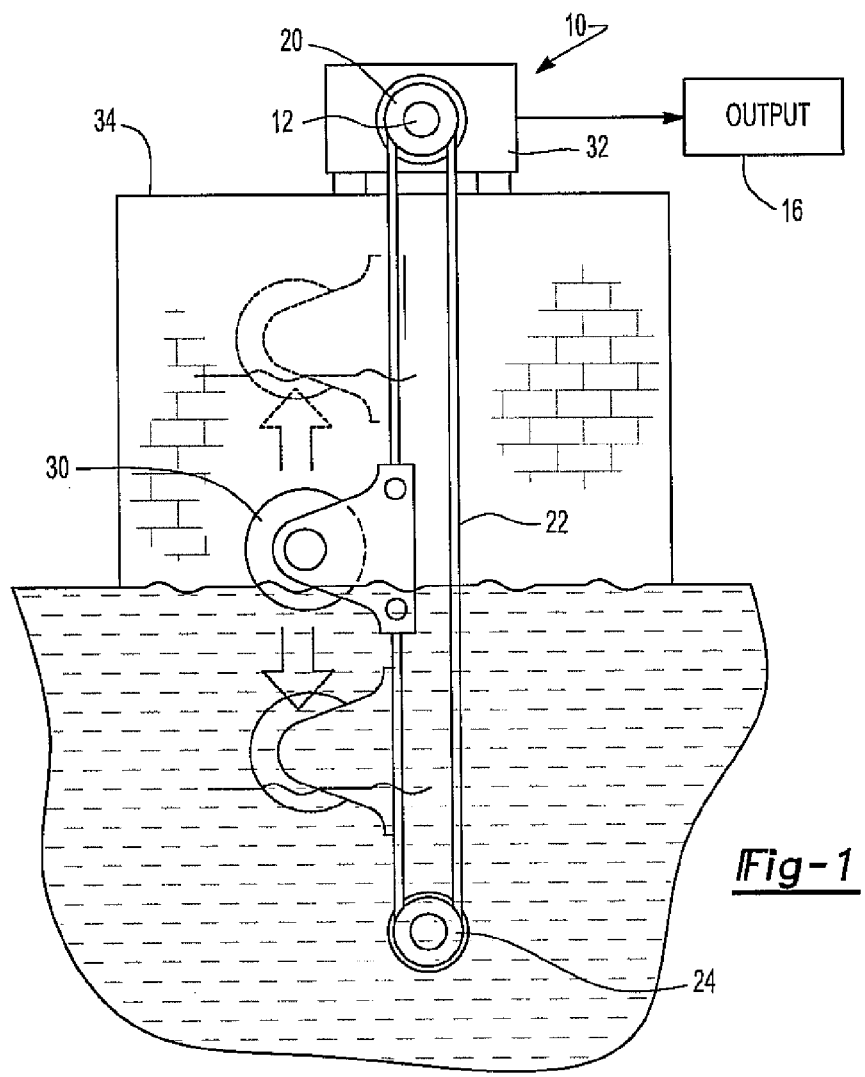
FIG. 1 is an environmental view illustrating a preferred embodiment of the invention in operation.
Figure 2:
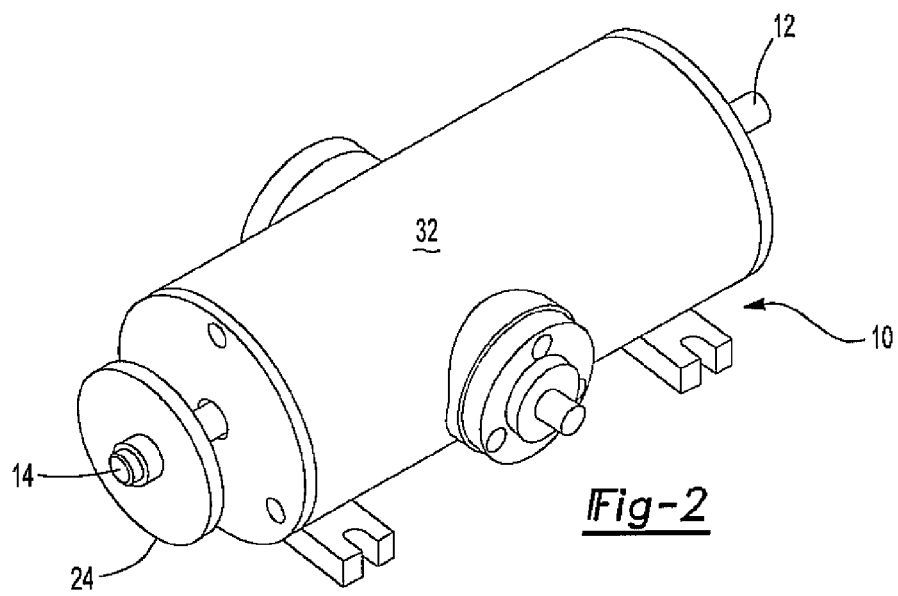
FIG. 2 is an elevational view illustrating the preferred embodiment of the invention and with parts removed.

With reference first to FIGS. 1 and 2, a preferred embodiment of the device 10 for harvesting energy from variations in water level is shown. The device 10 includes an input shaft 12 and an output shaft 14. The output shaft 14 is connected to an energy storage/generator device 16 which stores or generates energy in response to rotation of the output shaft 14.

For example, the energy storage/generator device 16 may comprise a pump for pumping water to an elevated level for subsequent release through a generator. During that subsequent release, electric energy is generated. Alternatively, the storage/generator device 16 may comprise an electrical generator.

Referring now to FIG. 1, a gear wheel or pulley 20 (collectively called pulley) is attached to the input shaft 12 so that the pulley 20 rotates in unison with the input shaft 12. An endless chain or belt 22 (collectively called belt) is disposed around the pulley 20 so that the belt 22 is drivingly connected to the pulley 20 and thus to the input shaft 12. It will be understood, of course, that any type of belt or chain may be used.

A second pulley 24 is also in mesh with the belt 22 at a position beneath the pulley 20. The pulley 24 rotates in unison with movement of the belt 22 and is at a fixed position below the water level 26 of a water body 28, such as a lake, ocean, or the like.

A float 30 is fixedly secured to the belt 22 and this float 30 remains at or near the top of the water level 26. Consequently, variations or changes in the water level 26 caused by waves or the like result in reciprocal vertical movement of the float 30. That reciprocal vertical movement is mechanically drivingly connected to the input shaft 12 so that the shaft 12 is also rotated in a reciprocal rotational fashion.

Figure 3:
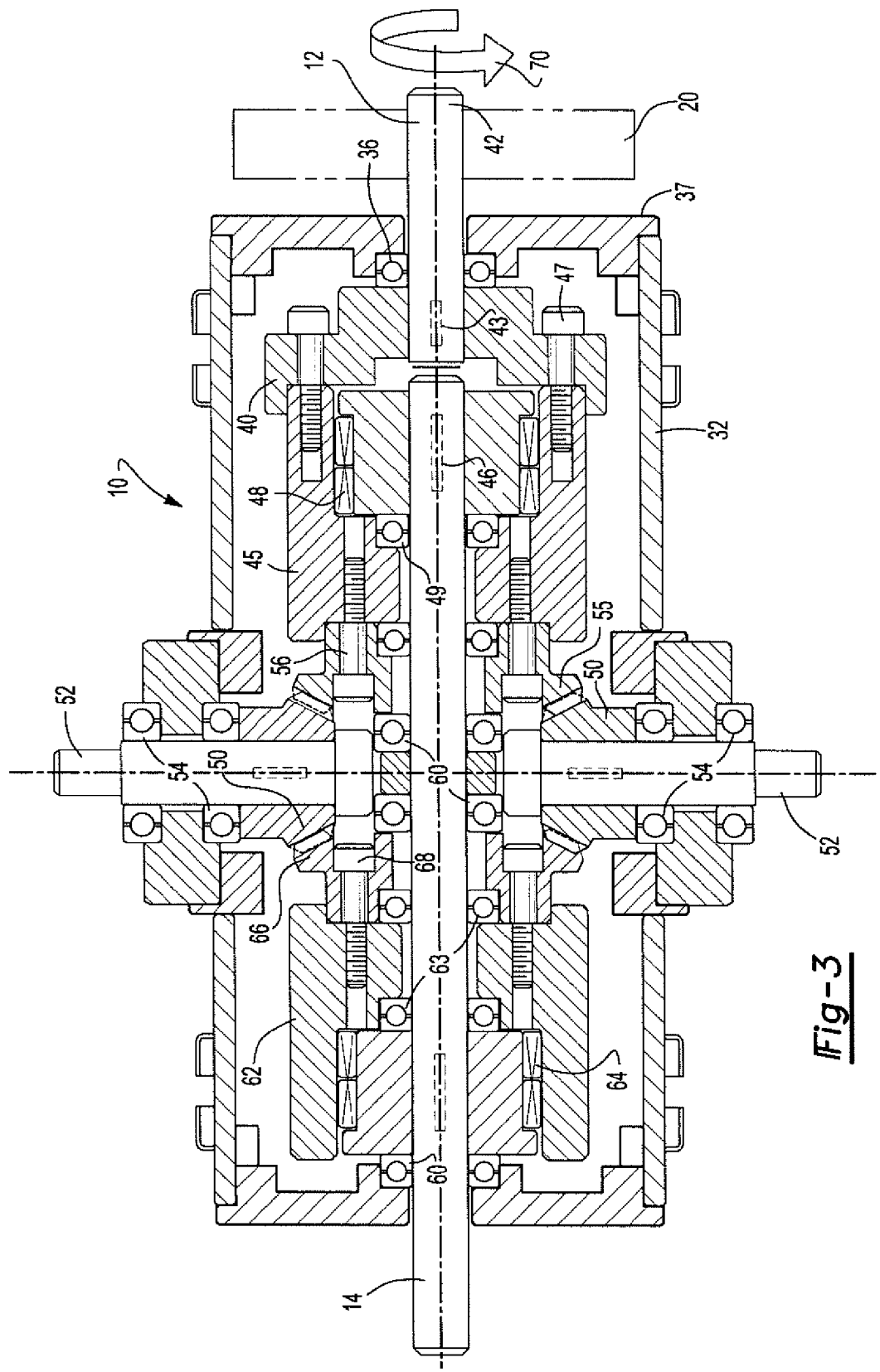
FIG. 3 is a longitudinal sectional view illustrating a first preferred embodiment of the present invention.

With reference now to FIG. 3, the device 10 includes a housing 32 which is secured to a stationary ground support surface 34 (FIG. 1) in any conventional fashion. The input shaft 12 is then rotatably mounted by a bearing 36 to one end 37 of the housing 32.

A hub 40 is attached to an end 42 of the input shaft 12 in any conventional fashion, such as a key 43, and an annular drive 45 is then attached to the hub 40 by bolts 47. In doing so, the drive is coaxially disposed around and rotatably mounted to an end 46 of the output shaft 12 by bearings 49. Consequently, reciprocal rotational movement of the input shaft 12 results in reciprocal rotational movement of the drive 40 around the end 42 of the output shaft 14.

A one-way clutch or sprague 48 is operatively disposed between the drive 40 and the end 42 of the output shaft 14. Consequently, upon rotational movement of the drive member 40 in a first rotational direction, the one-way clutch 48 engages and rotatably drives the output shaft 14 in that first rotational direction. Conversely, rotational movement of the drive member 40 in the opposite rotational direction causes the clutch 48 to disengage from the output shaft 14 and the drive 45 rotates on the bearings 49.

At least one and preferably two reversing gears 50 are rotatably mounted to the housing 32 by reversing gear shafts 52 and bearings 54. These reversing gears 50, furthermore, are angularly spaced from each other around the output shaft 14 and are preferably diametrically opposed to each other. Although only one reversing gear 50 is required for proper operation, the use of two reversing gears provides balance and reduces mechanical stress.

Each reversing gear 50 is preferably a bevel gear and meshes with a bevel gear 55 coaxially secured to the drive 45 by any conventional means, such as bolts 56, so that the bevel gear 55 is coaxial with the input shaft 12. Consequently, reciprocal rotation of the drive 45 by reciprocal rotation of the input shaft 12 reciprocally rotatably drives the reversing gears 50.

Still referring to FIG. 3, the output shaft 14 is rotatably mounted to the housing 32 by bearings 60. In doing so, the output shaft 14 is coaxial with the input shaft 12.

A second drive 62 is coaxially disposed around and rotatably mounted to the output shaft 14 by bearings 63. This drive 62, furthermore, is drivingly connected to the output shaft 14 by a second one-way clutch 64 which engages only when the drive member 62 rotates in the first rotational direction like the first clutch 48 and also disengages from the output shaft 14 when rotatably driven in the opposite rotational direction.

A bevel gear 66 is coaxially secured to the second drive member 62 by any conventional means, such as bolts 68. This bevel gear 66, furthermore, is also in mesh with the reversing gear or gears 50.

Figure 4:
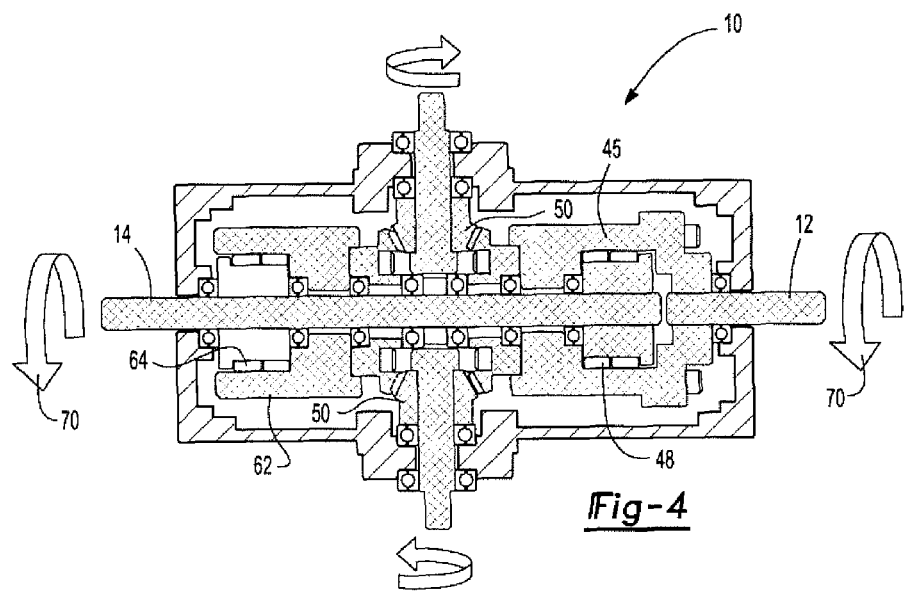
FIGS. 4 and 5 are sectional views illustrating the operation of the present invention.
Figure 5:
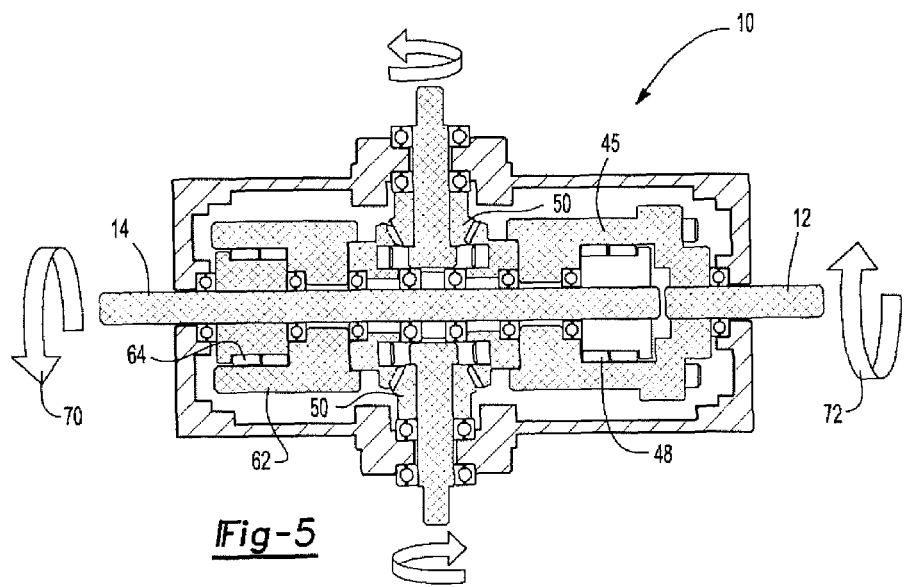

With reference to FIGS. 4 and 5, in operation, the reversing gear 50 rotatably drives the drives 45 and 62 in the opposite rotational directions depending upon the direction of rotation of the input shaft 12. For example, as shown in FIG. 4, rotation of the input shaft 12 in a first rotational direction 70 rotatably drives the first drive 45 in that direction 70 of rotation but drives the second drive member 62 in the opposite rotational direction. During that time period, only the first one-way clutch 48 is engaged which drives the output shaft 14 in that first rotational direction while the second clutch 64 is disengaged.

As the direction of rotation of the input shaft reverses as shown in FIG. 5, the reversed direction 72 of rotation of the drive 45 also reverses so that the first one-way clutch 48 disengages. However, at this time, the direction of rotation of the second one-way clutch 62 also reverses due to the reversing gears 50 thus driving the second drive 62 in the first rotational direction 70 and simultaneously driving the output shaft 14 in the first rotational direction 70 through the second one-way clutch 64. Simultaneously, the direction of rotation of the bevel gears 50 is also reversed.

Consequently, it can be seen that the output shaft 14 is continuously rotatably driven regardless of whether the water level is increasing or decreasing. The rotation of the output shaft 14 is then used to power the energy storage/generator device 16 (FIG. 1).

Figure 6:
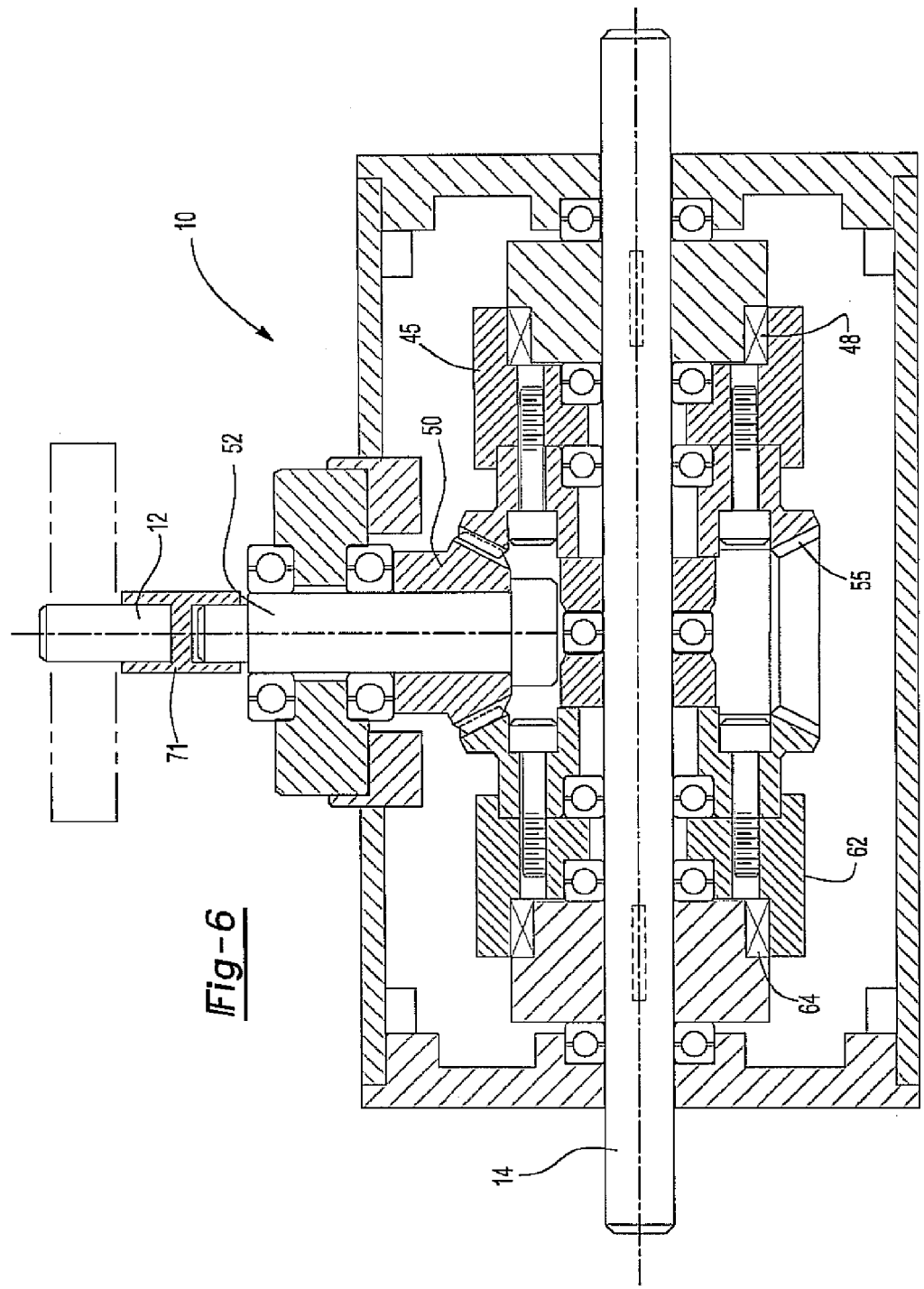
FIG. 6 is a view similar to FIG. 3, but illustrating a second preferred embodiment of the present invention.

With reference now to FIG. 6, a modified device 10' of the present invention is illustrated. The device 10' differs from the device 10 illustrated in FIG. 3 in that the input shaft 12 is directly coupled to the reversing gear shaft 52 by any conventional coupling 70. Consequently, reciprocal rotational movement of the input shaft 12 reciprocally rotatably drives the reversing gear 50. The reversing gear 50 then rotatably drives the output shaft 14 through the drives 45 and 62 and associated one-way clutches 48 and 64 in the previously described fashion.

From the foregoing, it can be seen that the present invention provides a simple yet effective device for harnessing the energy from changing water levels in a water body, such as waves. Having described my invention, however, many modifications thereto will become apparent to those skilled in the art to which it pertains without deviation from the spirit of the invention as defined by the scope of the appended claims.

I claim:

1. A device to capture energy from variations in water level in a water body comprising:
   a housing,
   an input shaft rotatably mounted to said housing,
   a drive band rotatably drivingly connected to said input shaft,
   a float attached to said drive band, said float disposed in the water body so that an increase in water level rotatably drives said input shaft in a first rotational direction and vice versa,
   an output shaft rotatably mounted to said housing,
   a first one-way clutch operatively disposed between said input shaft and said output shaft, said first one-way clutch drivingly connecting said input shaft to said output shaft upon rotation of said input shaft in a first rotational direction,
   a reversing gear rotatably mounted to said housing, said reversing gear drivingly connected to said input shaft,
   a second one-way clutch operatively disposed between said reversing gear and said output shaft, said second one-way clutch drivingly connecting said reversing gear to said output shaft upon rotation of said input shaft in a second rotational direction opposite from said first rotational direction,
   an energy storage/generator device operatively connected to said output shaft,
   wherein said reversing gear is drivingly connected between said first one-way clutch and said second one-way clutch, and
   a first bevel gear attached to said first one-way clutch, a second bevel gear attached to said second one-way clutch and wherein said reversing gear comprises a bevel gear in mesh with both said first bevel gear and said second bevel gear.

2. The device as defined in claim 1 wherein said input shaft is fixedly secured to and rotatably drives said reversing gear.

3. The device as defined in claim 1 wherein said energy storage/generator device comprises a pump.

4. The device as defined in claim 1 wherein said input shaft and said output shaft are coaxially rotatably mounted to said housing.

5. The device as defined in claim 1 wherein said reversing gear comprises a bevel gear.

6. The device as defined in claim 1 and comprising a second reversing gear rotatably mounted to said housing at an angular position offset from said first reversing gear.

7. The device as defined in claim 6 wherein said second reversing gear is offset 180 degrees from said first reversing gear so that said first and second reversing gears are coaxial.

8. The device as defined in claim 7 wherein said first and second reversing gears are both bevel gears.

9. A device to capture energy from variations in water level in a water body comprising:
   a housing,
   an input shaft rotatably mounted to said housing,
   a drive band rotatably drivingly connected to said input shaft,
   a float attached to said drive band, said float disposed in the water body so that an increase in water level rotatably drives said input shaft in a first rotational direction and vice versa,
   an output shaft rotatably mounted to said housing,
   a first one-way clutch operatively disposed between said input shaft and said output shaft, said first one-way clutch drivingly connecting said input shaft to said output shaft upon rotation of said input shaft in a first rotational direction,
   a reversing gear rotatably mounted to said housing, said reversing gear drivingly connected to said input shaft,
   a second one-way clutch operatively disposed between said reversing gear and said output shaft, said second one-way clutch drivingly connecting said reversing gear to said output shaft upon rotation of said input shaft in a second rotational direction opposite from said first rotational direction,
   an energy storage/generator device operatively connected to said output shaft,
   wherein said second reversing gear is offset 180 degrees from said first reversing gear so that said first and second reversing gears are coaxial.

10. The device as defined in claim 9 wherein said first and second reversing gears are both bevel gears.

* * * * *